United States Patent [19]

Bosy et al.

[11] 4,112,131

[45] Sep. 5, 1978

[54] METHOD FOR MANUFACTURE OF PROCESS CHEESE

[75] Inventors: George Bosy, Park Ridge; Edwin N. Edwards, Glenview; Willis M. Hoffbeck, Palatine; Paul A. Silvio, Mount Prospect, all of Ill.; Leonard A. Warwick, Woburn, Mass.

[73] Assignee: Kraft, Inc., Glenview, Ill.

[21] Appl. No.: 766,853

[22] Filed: Feb. 9, 1977

Related U.S. Application Data

[63] Continuation-in-part of Ser. No. 609,520, Sep. 2, 1975, abandoned.

[51] Int. Cl.$^2$ .................... A23C 19/00; A23C 19/02
[52] U.S. Cl. ................................ 426/582; 99/454; 426/510; 426/511; 426/388
[58] Field of Search ............. 426/582, 511, 523, 510, 426/519, 388; 99/348, 454, 353, 452; 259/4 AB

[56] References Cited

U.S. PATENT DOCUMENTS

| | | | |
|---|---|---|---|
| 1,639,828 | 8/1927 | Wheeler et al. | 426/511 |
| 1,796,445 | 3/1931 | Doering et al. | 99/348 X |
| 2,021,899 | 11/1935 | Schneider | 426/511 X |
| 3,704,006 | 11/1972 | Grout et al. | 259/4 AB |
| 3,800,985 | 4/1974 | Grout et al. | 259/4 AB |

*Primary Examiner*—Kenneth M. Schor
*Attorney, Agent, or Firm*—Fitch, Even, Tabin & Luedeka

[57] ABSTRACT

A continuous, in-line, method and apparatus for cooking process cheese products. Raw material, comprises a uniform blend of cheese with appropriate additives, for introducing into a pressurized cooking zone. Steam is injected directly into the raw material in a confined region to heat and melt the raw material into a molten mass. The molten cheese mass is delivered from the cooking zone to a mixing zone where the steam is mixed with the cheese and the temperature of the molten cheese mass is equilibrated. The molten cheese is delivered from the mixing zone to a low pressure cooling zone where deaeration and cooling of the molten mass is effected via a sharp reduction in pressure.

3 Claims, 4 Drawing Figures

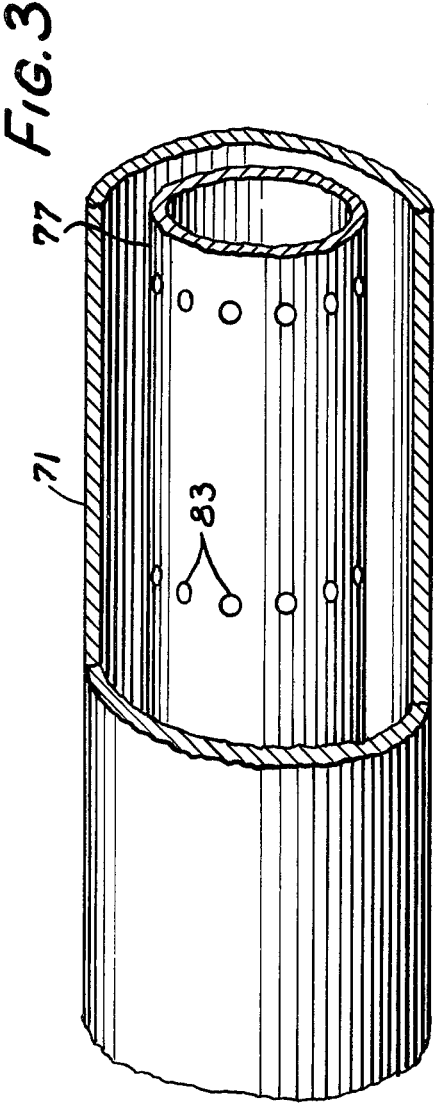
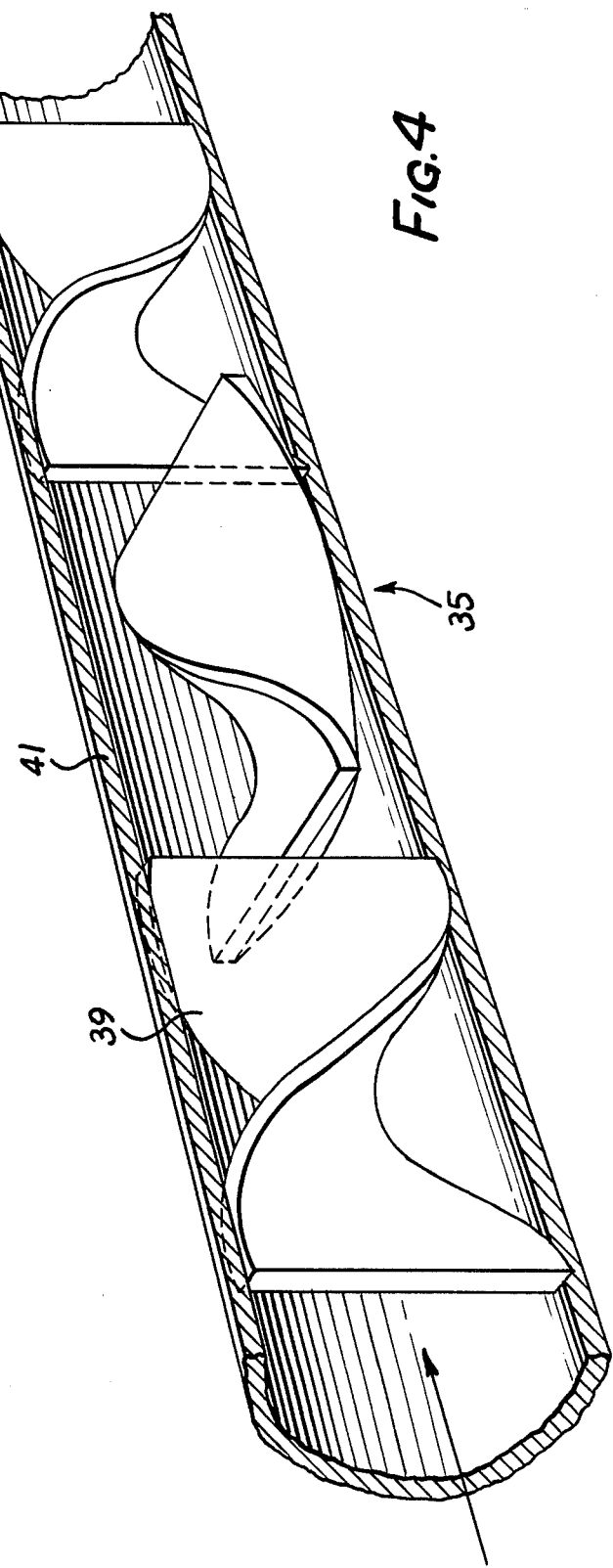

METHOD FOR MANUFACTURE OF PROCESS CHEESE

The present application is a continuation-in-part of application Ser. No. 609,520, filed Sept. 2, 1975 now abandoned.

The present invention relates generally to the cooking of cheese. More particularly, the present invention relates to a continuous in-line, method and apparatus for cooking process cheese products.

Process cheese products include those products prepared by forming a particular blend of one or more comminuted natural cheeses, to which may be added various additives such as whey, condiments and/or emulsifying salts, heating, melting and mixing the cheese blend to form a homogenous molten mass, followed by cooling and solidification of the molten mass. The heating, melting and homogenizing of the blend of cheese raw materials to form a molten mass is known as "cooking" and the apparatus for accomplishing this result is known as a "cooker." Heating of cheese in a cooker to make process cheese products has been long known in the art.

As used herein, the term "process cheese product," includes those products which are identified according to Federal standards as process cheese, process blended cheese, process cheese food, and process cheese spread. These products have recognized and established differences in composition, principally fat and moisture content, and permissible additives. However, all of these products are manufactured by a method which includes cooking a blend of cheese with certain additives, and the method and apparatus described herein is particularly adapted for the manufacture of these process cheese products.

In the manufacture of process cheese products, one or more natural cheeses of the same or different age and/or variety are ground or comminuted in a grinder, and are blended together in a suitable blender, for example a ribbon blender, to provide an uniformly mixed raw material. The blended raw material is then introduced into a heating and mixing apparatus, i.e., a cooker. Emulsifiers and other additives, when used, are introduced into the raw material in the blender or the cooker.

In prior manufacture of process cheese products, two forms of cookers have been generally known, one being a steam jacketed kettle equipped with a mechanical agitator and the other being a horizontally extending cooker also known as a "lay-down" cooker having a screw in the cooker chamber. Live steam is injected directly into the chamber and raw material at atmospheric pressure as the raw material is agitated by the screw. The raw material is heated in the cooker to a temperature of at least 150° F., usually 160° F. to 190° F., and is held at that temperature for at least 30 seconds, but usually for about 5 minutes, depending in part upon the raw material and the desired cheese product.

The conventional cheese cookers used in the manufacture of process cheese products are essentially batch-type cookers in which an amount of raw material is introduced into the cooker, and heated and agitated to provide homogenized molten mass. The molten mass is then intermittently discharged from the cooker for appropriate handling.

The design and operation of the cooker is critical in obtaining a good process cheese product. Mere heating of the cheese blend without proper agitation results in separation of the fat, thus failing to provide a satisfactory emulsion. Too much agitation during heating results in over-emulsification and a process cheese product having undesirable body characteristics. Also maintenance of the process cheese at the cooking temperatures for extended period of time is undesirable and burn-on of the cheese onto the sides of cookers has been a problem.

When the cheese has been cooked to the degree desired, which can be readily determined by one skilled in the art, the molten process cheese product is withdrawn from the cooker, cooled to a proper packaging or filling temperature and packaged. Packaging may take any one of a number of forms, for example loaves or jars. Alternatively, the molten process cheese product may be formed into slices by distributing the product upon the surface of a cooled rotating chill roll in the form of a thin layer which solidifies into a sheet which is removed from the chilled surface of the roll, cut into strips and subsequently into slices followed by packaging of the sliced process cheese product.

It has been known to continuously inject steam into a molten cheese mass for the purpose of pasteurization or sterilization. However, the direct injection of steam into a cheese raw material in a continuous system has not been used for the purposes of causing melting and cooking of the raw material. Heretofore, there has not been a commercially feasible process for continuous in-line cooking in the manufacture of process cheese products to provide a molten cheese mass from the raw material. The advantages of continuous in-line cooking of cheese as compared to batch operations are readily apparent both from the standpoint of the amount of cheese which can be processed in a work day and the advantages which can accrue through improved control techniques in an in-line process.

Accordingly, it is a principal object of the present invention to provide an improved method and apparatus for the cooking of cheese.

Another object of the invention is to provide a method and apparatus for the continuous in-line cooking of raw materials in the manufacture of process cheese products, particularly by the direct introduction of steam into a raw material including a cheese blend.

A further object of the invention is to provide a method and apparatus for the manufacture of process cheese products in which the blend of raw materials is rapidly heated to an elevated cooking temperature at elevated pressures by direct injection of steam, and the resulting molten cheese mass is quickly cooled from the elevated cooking temperature to an appropriate packaging temperature, the method and apparatus providing a process cheese product of desired body and texture.

These and other objects of the invention will become apparent from the following detailed description including the attached drawings in which:

FIG. 3 is an exploded fragmentary sectional view of the apparatus of FIG. 2 illustrating a preferred arrangement for introducing steam in the method of the invention; and FIG. 4 is a schematic view of a static mixer suitable for use in the in-line cooking of process cheese products.

Figure 1:
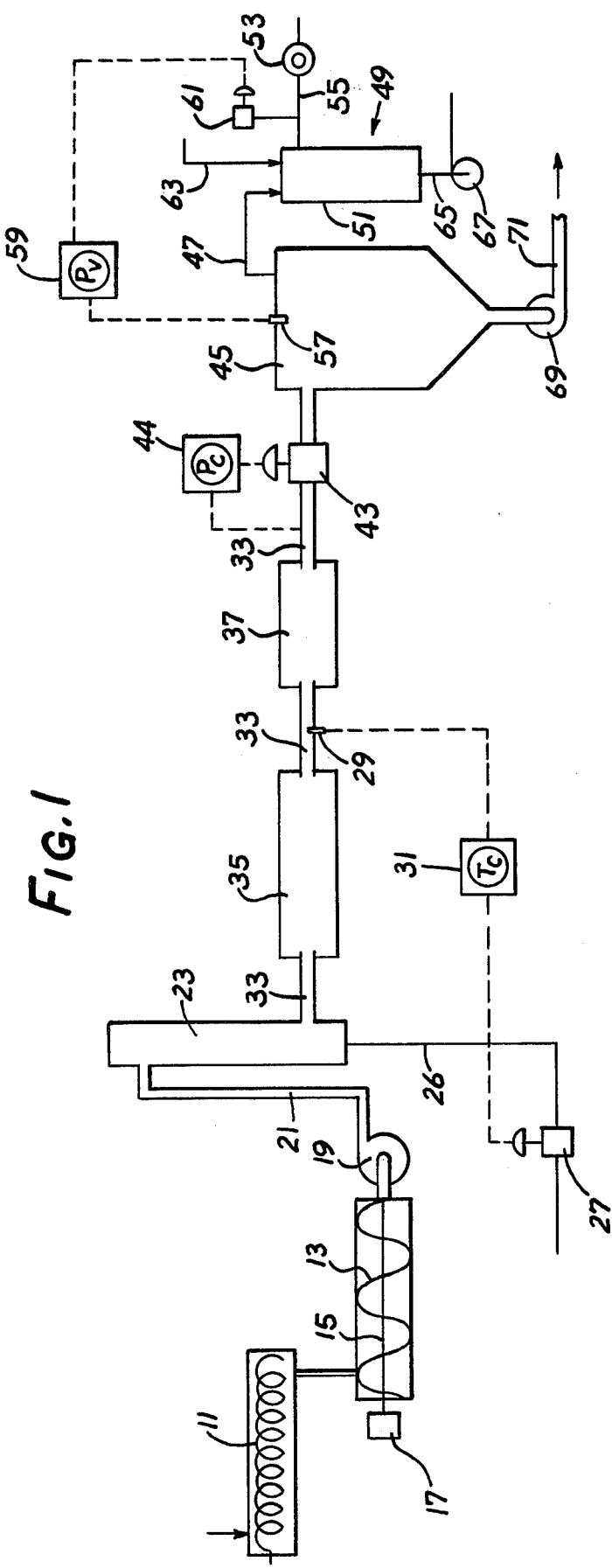
FIG. 1 is a flow sheet depicting one embodiment of a method for the manufacture of process cheese products by an in-line method in accordance with the present invention.

Generally, in accordance with the method and apparatus disclosed herein, process cheese products are prepared on a continuous in-line basis by introducing a raw material comprising a uniform blend of cheese and/or a cheese curd with appropriate additives into a pressurized cooking zone maintained at a pressure above atmospheric pressure. Steam is injected directly into the raw material in a confined region and is substantially condensed within the confined region thus heating and melting the raw material into a molten mass. The molten mass is subjected to shear due to the turbulence caused by introduction of the steam and the action in the confined region which results in partial emulsification and homogenization of the molten mass. Sufficient steam is introduced into the cheese blend to provide a molten mass, and generally sufficient steam is introduced to heat the molten mass to a temperature sufficiently high to cause pasteurization, or sterilization, if such is desired. The condensation of the steam in the molten cheese mass also increases the moisture content of the raw material thus aiding in the cooking and emulsifying process. The molten cheese mass is delivered from the cooking zone to a mixing zone where the steam is mixed with the cheese and the temperature of the molten cheese mass is equilibrated. The molten cheese is delivered from the mixing zone to a cooling zone having a pressure lower than the pressure of the cooking zone. As the molten cheese passes from the mixing zone to the cooling zone, expansion of the molten cheese takes place causing deaeration and vaporization of a portion of the moisture in the molten cheese.

The amount of vaporization which takes place determines the final moisture and temperature of the finished cheese and is dependent on the absolute pressure in the cooling chamber.

Control of the final moisture and temperature of the process cheese product may be attained by controlling the absolute pressure in the cooling chamber. The amount of moisture removed, as vapor, from the cheese as it is cooled in the cooling chamber from its cooking temperature to the final cooling chamber discharge temperature, is equal to the amount of moisture which had previously been added to the cheese as steam during that portion of the steam injection heating step wherein the temperature of the cheese was increased from a temperature equivalent to the cooling chamber discharge temperature to the final cooking temperature.

Thus, when using the direct steam injection, pressure differential cooling process of the present invention, the moisture content of the finished cheese is a function of the difference in temperature between the starting raw material blend and the final cheese temperature in the cooling chamber. Any moisture added as steam above this temperature, regardless of amount, is removed during cooling. This permits cooking of the cheese at a variety of temperatures as required to obtain the desired finished cheese properties or sterilization without affecting the finished moisture of the processed cheese. Of course, the initial moisture in the raw material needs to be considered to obtain the desired final moisture.

Referring now to FIG. 1, there is illustrated a schematic flow diagram of a preferred embodiment of the disclosed invention. The raw material, which may include one or more aged natural cheeses, short held cheese, and current cheese are comminuted in conventional grinders (not shown) and whey, cream, condiments, emulsifiers, as may be desired in the final process cheese product, are mixed with the comminuted cheese in a blender 11. The blender 11 may be of any conventional type adapted to mix raw materials for process cheese products. Generally, the blender 11 is a ribbon blender and is utilized to provide a uniformly mixed raw material mass for utilization in the method of the invention. In FIG. 1, a single blender is illustrated, but it is to be understood that any number of blenders may be utilized to provide a raw material in proper condition for cooking. In a preferred embodiment of the invention at least two blenders are utilized which alternately feed raw material to the in-line cooking system of the invention.

The blended raw material is delivered from the blender 11 to an auger 13. The auger 13 is supported on a shaft 15 driven by a suitable motor 17 to provide a positive supply of raw material from the blender 11 to a pump 19. Other suitable means for positively moving the raw material from the blender 11 to the pump 19 may be utilized, and it is also possible to eliminate the auger 13 and to feed the pump 19 directly from the blender 11. However, in so doing, there is risk of surging in the feed supply to the pump which may result in uneven movement of the raw material through the in-line cooking system of the invention.

The raw material is delivered from the blender 11 by means of the auger 13 to a feed pump 19. The feed pump 19 may be of any design capable of pumping the material through conduit 21 into a steam infusor 23 which is operated at a pressure above atmospheric pressure, and thus above the pressure within the blender 11 which is open to the atmosphere. A preferred form of feed pump 19 is a positive displacement pump utilizing lobe rotors. Such pumps are of conventional design and variety and are selected based upon the particular needs and capacities of the system. A check valve (not shown) may be provided in the conduit 21 between the pump 19 and the steam infusor 23 to prevent back flow of product from the infusor 23.

The steam infusor 23 receives steam from a suitable source through a line 26 and a control valve 27.

A preferred design of the steam infusor 23 is disclosed in detail hereinafter. The steam is injected into and condensed in the raw material in a region of confined turbulence in order to heat the raw material to form a molten mass and to effect partial mixing of the steam with the raw material and partial homogenization and emulsification of the molten cheese mass, as hereinbefore pointed out. A temperature sensing device 29 is provided which may be utilized with a conventional control system 31 to monitor the amount of steam through the control valve 27.

From the infusor 23 the molten mass is delivered through conduit 33 to a mixing zone which includes a static mixer 35 and a strainer 37 in the conduit 33.

The static mixer 35 (as best seen in FIG. 4) is a fixed in-line mixer having no moving parts. The static mixer is a series of fixed, helical elements 39 enclosed within a tubular housing 41. The molten mass divides at the leading edge of each element. At each succeeding element a further division occurs resulting in a exponential increase in stratification. The number of striations produced is $2^n$ where $n$ is the number of elements. It has been found that a static mixer having a housing inside diameter of 1.5 to 3 inches and having six units is suitable for the range of flow rates contemplated by the in-line cooker system of the invention. However, other sizes with different numbers of elements are equally suitable. Also, other types of in-line mixers which produce equivalent mixing can be used. The strainer 37 may be a plate or a series of plates provided with holes through which the molten mass is forced. A preferred type of strainer is one or more cylinders located in conduit 33. Each of the cylinders contains a number of holes surrounded by a wire mesh. The molten cheese mass flows first through the wire mesh through the holes into the interior of the cylinder.

The static mixer is required to finish mixing the steam with the molten mass. The strainer plate or plates are used to prevent undesired lumps of material from the infusor 23 from proceeding through the process.

The molten mass is then passed through a pressure controlled valve 43 into a cooling tank 45 maintained at a pressure lower than the pressure in the steam infusor 23 and conduit 33. The cooling tank 45 is desirably under vacuum and is connected by a conduit 47 to a condenser 49 which functions in providing a vacuum for the cooling tank. In this connection and as shown in the apparatus illustrated in the flow diagram of FIG. 1, the condenser 49 includes a cylindrical column 51 connected to a source of vacuum 53 through line 55. The vacuum in column 51 is maintained at the desired level by means of a vacuum control circuit which may be of conventional design and includes a sensor 57 located in the column 51 and a vacuum controller 59 which controls a valve 61 in the vacuum line 55. Cooled water is introduced into the column 51 through an inlet 63 and is withdrawn through an outlet 65 by means of pump 67. The cooled water condenses steam from the tank 45 and thus aids in establishing a lower pressure in the tank.

When the molten mass is delivered through the valve 43 into the cooling tank 45 at a lower pressure, preferably a vacuum, it is passed from a zone of high pressure, generally above atmospheric pressure, substantially instantaneously into a zone of reduced pressure which is preferably a vacuum. The rapid reduction in pressure causes deaeration of the molten mass and also causes a portion of the water contained in the molten mass to be vaporized, thereby reducing the temperature of the molten mass. The pressure controlled valve 43 is operated by a pressure controller 44 to maintain a pressure in the range of from about 5 to about 60 psig.

The moisture of the molten mass in the high pressure zone is in the range of from about 41 percent to about 75 percent by weight and the pressure is in the range of from about 2 to about 60 psig. The pressure of the reduced pressure zone is in the range of from about 3 to about 15 psia with the proviso that the reduced pressure zone has a pressure at least 4 psi less than the pressure of the high pressure zone. The thermodynamic balance is such that the moisture present in the molten mass is reduced by from about 2 to about 25 percent by weight based on the weight of the moisture present in the molten mass to provide a cooled cheese product in the cooling tank 45 having a moisture content of from about 40 to about 70 percent by weight at a temperature of from about 150° F. to about 210° F. The temperature of the cheese product is reduced by from about 15° F. to about 150° F. as it passes from the high pressure zone into the reduced pressure zone.

The molten mass is collected at the bottom of the cooling tank 45, which is desirably concially shaped. The molten mass is discharged to a product discharge pump 60. The cooling tank may be provided with an agitator or auger (not shown) to facilitate discharge of the molten cheese mass. The pump 69, which may be of conventional design and may be generally similar to pump 19, provides for discharge of the process cheese product through conduit 71 to a suitable station (not shown) for packaging or further forming. It is contemplated that various forms of filling stations may be used and that the product may be formed into loaves, packaged in jars, or delivered to a chill roll for the manufacture of slices.

The cooling tank 45 may also be utilized as a holding tank for the process cheese product and in this connection it may be utilized as a storage device when changing from one filling unit to another or if there is a mechanical breakdown at the filling station. It is contemplated that the cooling tank 45 may also be provided with suitable level control indicators and level controls, (not shown) which in turn control the introduction of raw material into the infusor 23 based upon the level of cooked cheese product in the cooling tank. Thus, overall control between input of raw material and output of the process cheese product can be maintained.

The continuous in-line cooking process described herein and as illustrated in FIG. 1 has decided advantages in the manufacture of process cheese products. The raw material may be selected and prepared in a conventional manner and it is contemplated that the emulsifier salts, for example, disodium phosphate and sodium citrate, or mixtures thereof may be added in the blender 11. Alternately, the emulsifier salts may be dissolved and the emulsifier salt solution may be added at point downstream from the blender 11. In this connection the emulsified salt solution may be conveniently added at the pump 19 by introducing the emulsifer salts into the suction side of the pump or may be pumped into conduit 33 between steam infusor 23 and static mixer 35. It has been found that introduction of a solution of the emulsifier salts has a decided advantage in that the amount of emulsifier required to produce a desirable process cheese product may be reduced by as much as one half. Also, a more flexible variety of process cheese products may be manufactured. Other ingredients such as condiments, flavors, coloring agents and a wet mix comprising whey solids, milk and water, can also be added to the blender or at a point downstream from the blender.

The continuous in-line cooking process has further advantages in that the flow through the system may be regulated to provide a desired volume of process cheese product per unit of time. For example, the process illustrated in FIG. 1 may be controlled to provide between about 20 and about 400 pounds per minute of process cheese product by controlling the speed of the pump 69 and the raw material pump 19 in correlation with the volume of steam being injected into the infusor 23 and the size of steam infusor 23.

The amount of steam introduced into infusor 23 is dependent upon the temperature required for cooking. Generally, it is desirable to heat the raw material to above pasteurization temperatures, for example, above 165° F., and in some instances up to temperatures which insure sterilization, for example 275°–300° F. The temperature of the raw material flowing through the infusor 23 is measured by the temperature sensors 29 which in turn control by means of the control system 31 the flow of steam through the steam valve 27. The steam may be supplied at any desirable pressure, for example, between about 50 and 200 psig., preferably between about 75 and 150 psig. The steam may be saturated or super-heated. Generally, the use of saturated steam has been found to be satisfactory. The quality of the steam is considered in determining the amount of water which is added to the raw material.

Process cheese products generally have moisture in the range of 40-70 percent by weight. The lowest moisture products being identified as process cheese and the highest moisture products being identified as a cheese sauce. In general, the higher the moisture content, the higher the temperature that can be used during cooking. Higher temperatures are desirable to permit pasteurization or sterilization at shorter hold times. However, it has been heretofore necessary to carefully control the addition of water and to minimize the addition of water during cooking since water could not be removed after cooking. In accordance with the present invention, excess water may be added to the raw material during cooking and homogenization, which is generally desirable, and the excess is removed during cooling in the tank 45. It is emphasized that an important advantage of the process of the invention is the ability to use excess moisture during cooking with removal of the excess in the process.

In order to provide for proper heating and moisture removal during cooling of the product, the product in the infusor 23 and the conduit 33 is maintained at a pressure above atmospheric. It has been found that pressures between about 4 psig. and about 100 psig. are suitable. Preferably, pressure between about 4 psig. and 80 psig. are used.

The difference between the pressure of the product in the infusor 23 and the conduit 33 and the pressure in the cooling tank 45 is controlled to provide a desired cooling of the product and also to provide for removal of excess water with deaeration of the product. In this connection, an absolute pressure of from about 7 to about 29 inches of mercury in the condenser 51 and the cooling tank 45 has been found to be desirable when the process cheese product is cooled to between 150° F. and 210° F. Other suitable pressures may be maintained in the cooling tank 45 in order to provide particular process cheese product temperature, moisture reduction and deaeration. Since moisture is removed during cooling, higher moisture levels may be utilized in the steam infusor 23 whereby higher cooking temperatures can be utilized with resultant desired body and texture characteristics in the process cheese products.

Figure 2:
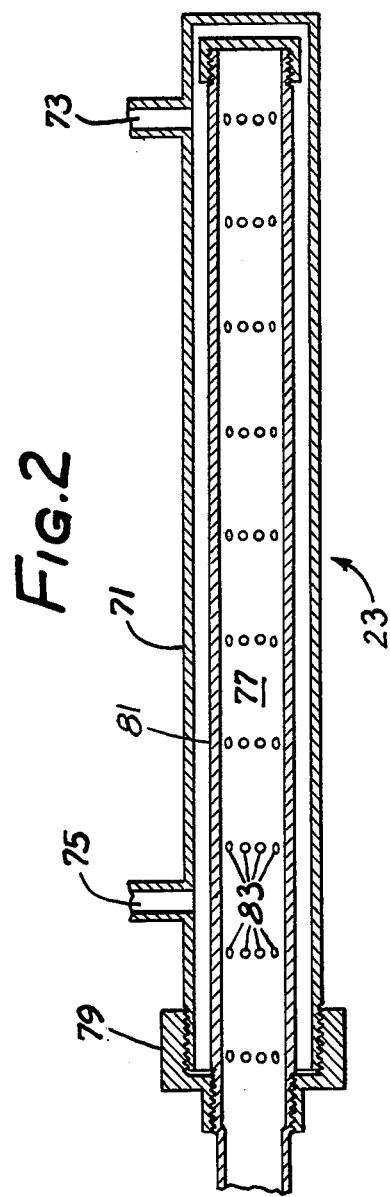
FIG. 2 is a sectional view of one embodiment of a steam infusor suitable for use as a cooker in the continuous in-line cooking of process cheese products.

Referring now to FIG. 2, there is illustrated a preferred embodiment of a steam infusor 23 for cooking the raw material. The steam infusor illustrated in FIG. 2 in combination with the static mixer illustrated in FIG. 4 has been found to be particularly desirable in that it provides desired mixing of steam with the raw material and uniform heating of the raw material in an in-line process. Heretofore, it has been difficult to obtain uniform heating and emulsification of the raw material in an in-line cooking process due to the fact that the addition of heat by direct steam injection or indirect heating to the raw material under in-line conditions resulted in poor heat distribution over too long a period of time with fat separation and undesired body and texture. However, in accordance with the disclosed invention, the steam infusor 23 in combination with the mixing zone including the static mixer 35 and the strainer 37 and a cooling zone provides a convenient, economical, and highly satisfactory apparatus for cooking raw material to provide a process cheese product having desired body and texture and without fat separation.

The steam infusor 23 includes a housing 71 which is in the illustrated embodiment, generally cylindrical. The housing 71 is provided with an inlet 73 for receiving the raw material into the apparatus and an outlet 75 for discharging the molten mass. Referring to FIG. 1, the inlet 73 is connected through a conduit 21 to the pump 19. The outlet 75 is connected to the static mixer 35 by conduit 33.

A steam injector, identified generally by numeral 77 is connected to the housing 71 by means of a suitable coupling 79. The steam injector 77 projects into the housing 71. As seen in FIG. 2, the steam injector 77 is a length of conduit having a plurality of steam injection holes 83 for direct injection of steam in the flow of raw material passing from 73 to outlet 75. The diameter of the holes 83 is important; if too small, the steam may not properly penetrate the flowing mass of raw materials; it too large improper steam distribution would be a problem. In general, the holes 83 should have a diameter of between about 0.01 and 0.07 inches, pre-ferably from about 0.02 to about 0.05 inches.

It has been determined that the proper conditions for cooking the raw materials are dependent upon the flow rate of raw materials, the effective length of the steam conduit 81 which is the length over which injection holes 83 are dispersed, the area of the annulus formed by the housing 71 and steam injector 77, the number of holes 83 and the distance between the outer diameter of the conduit 81 and the inner diameter of the housing 71. In general, as the flow rate is increased each of the other parameters is also increased. However, each of the factors has a limit beyond which suitable operation of the in-line cooking system cannot be maintained. In general, the flow rate can be from about 20 to about 400 pounds per minute, the effective length of the steam injector can be between 10 and 40 inches, the area of the annulus can be between about 0.75 and about 6 square inches, the number of holes can be between about 50 and about 600 and the distance between the outside diameter of steam injector 77 and the inside diameter of the housing 71 can be from about 0.25 to about 1 inch. It should be understood that lower numbers of each range are associated with the lowest flow rates; the highest numbers with the highest flow rates and intermediate numbers with intermediate flow rates. Representative conditions for three different flow rates are set forth below in Table I.

TABLE I

| | | | |
|---|---|---|---|
| Flow rate/pounds per minute | 50 | 100 | 200 |
| Effective length of steam conduit | 12 | 16 | 25 |
| No. of holes | 100 | 198 | 400 |
| Size of holes | .031 | .031 | .031 |
| Housing (Inside Diameter) | 1.37 | 1.87 | 2.87 |
| Steam Conduit (Outside Diameter) | .75 | 1 | 1.5 |
| Area of Annulus (Square Inches) | 1.031 | 1.960 | 4.70 |
| Distance Between Housing ID and Injector OD | .31 | .435 | .685 |

In the manufacture of process cheese products in a continuous in-line cooking operation, it has been found that the introduction of the steam into the raw material in a confined region has particularly desirable results. The raw material first enters the steam infusor 23 through the inlet 73 and passes through the infusor to the outlet 75 in a relatively short period of time, i.e., from about 0.5 seconds to about 5 seconds. As a result of the short period of time during which the raw material is subjected to steam heating, higher product temperatures can be used, i.e., from about 170° F. to about 300° F.

The steam issuing from the holes 83 is injected into the raw material within a confined region wherein the high velocity of the steam causes increased turbulence and mixing of the steam with the raw materials. As the steam is mixed with the raw material, the raw material becomes heated and melted and at the same time the steam is condensed. Further mixing of the steam and emulsification of the product is accomplished by passing the mixture of steam and the molten mass of raw material through static mixer 35 and strainer 37.

EXAMPLE I

In accordance with this example, process cheese was manufactured in a continuous in-line cooking process utilizing the apparatus disclosed herein.

A cheese blend was used which included about 40 percent current cheddar type cheese, 30 percent cheddar type cheese aged 3-5 months, and about 30 percent of other cheese including swiss cheese and rework, each of the cheeses having been ground in a conventional cheese mill. The cheese blend also included 1.5 percent by weight of a phosphate emulsifier. The components of the cheese blend were introduced into a ribbon blender 11 and mixed to provide a homogeneous raw material. The raw material had a moisture content of about 41.4 percent by weight and was at a temperature of about 75° F.

The raw material was delivered from the blender 11 to an auger 13. The auger 13 was used to feed the raw material into a positive displacement pump 19. The feed pump was adjusted to introduce the raw material into the steam infusor 23 at a rate of about 100 pounds per minute. The steam infusor 23 which was of the type described above and illustrated in the drawings, had dimensions as described in Table I for a 100 pound per minute flow rate. The steam infusor was fed by a 1.5 inch steam line.

The positive displacement pump 19 forces the raw material through the annular region of the steam infusor 23 while steam was injected into the cheese mass. Saturated steam at a pressure of 90 psig. was used. The pressure in the steam infusor 23 was about 20 psig. The steam was condensed in the infusor 23 and provided a heated, fluid, molten mass. The molten mass issuing from the steam infusor 23 had a moisture content of about 45.5 percent by weight and a temperature of about 190° F.

From the steam infusor 23 the molten mass was passed by conduit 33 through static mixer 35 and strainer 37 and was delivered into the cooling tank 45 through a valve 43. Static mixer 35 had an inside diameter of 2⅜ inch and contained six elements. The pressure in conduit 33 just prior to valve 43 was about 5 psig.

The cooling tank 45 was maintained at a pressure of about 12-13 inches of mercury absolute by means of a vacuum condenser 49. Expansion of the molten mass through the valve 43 causes a reduction in the temperature of the cheese product to about 165° F. In addition, the expansion deaerated the molten mass and reduced its moisture content to about 44.6 percent by weight. The cooling tank 45 was discharged into a positive displacement pump 69 which fed to a filling station.

The process cheese product prepared in accordance with this example was found to have good body and texture and a typical cheddar type process cheese flavor.

What is claimed:

1. A method for continuous in-line manufacture of process cheese comprising the steps of blending process cheese materials at ambient temperature to provide a mix, conveying said mix under pressure first through a heating zone and then through a mixing zone to provide a homogeneous molten cheese mass having a moisture of from about 42 to about 75 percent under pressure of from about 5 to about 60 psig in said mixing zone at a temperature of from about 165° F. to about 300° F. and thereafter transferring said molten cheese mass from said mixing zone into a chamber maintained at a pressure lower than the pressure of said molten cheese mass in said mixing zone so as to cool said molten cheese mass to a temperature of from about 150° F. to about 210° F., said pressure in said chamber being from about 3 to about 15 psia with the proviso that the reduced pressure is at least 4 psi less than the pressure in said mixing zone, said heating zone comprising a steam injection conduit located within a housing to define an annular passage for flow of said mix, said mix passing between said conduit and said housing, said conduit having a plurality of steam injection holes spaced along its length for injection of steam into said mix during said flow to heat said mix to said temperature of from about 165° F. to about 300° F., while said mix flows through said annular passage, said holes having a diameter of from about 0.02 to about 0.07 inches, the thermodynamic balance between said mixing zone and said reduced pressure chamber being such that the moisture of said molten mass in said mixing zone is reduced by from about 2 to about 25 percent by weight based on the weight of the moisture present in said molten mass to provide a cooled cheese product having a moisture content of from about 40 to about 70 percent by weight.

2. A method in accordance with claim 1 wherein said mixing zone comprises a static mixer and a strainer.

3. A method in accordance with claim 1 wherein said cold mix is transferred at a continuous through-put rate of from about 20 to about 400 pounds per minute.

* * * * *